US012450469B1

(12) United States Patent
Refaat (10) Patent No.: US 12,450,469 B1
(45) Date of Patent: Oct. 21, 2025

(54) ANOMALY ESTIMATION NEURAL NETWORKS FOR BEHAVIOR PREDICTION

(71) Applicant: Waymo LLC, Mountain View, CA (US)

(72) Inventor: Khaled Refaat, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 381 days.

(21) Appl. No.: 17/842,605

(22) Filed: Jun. 16, 2022

(51) Int. Cl.
*G06N 3/045* (2023.01)
*B60W 60/00* (2020.01)

(52) U.S. Cl.
CPC ......... *G06N 3/045* (2023.01); *B60W 60/0027* (2020.02); *B60W 2556/45* (2020.02)

(58) Field of Classification Search
CPC .............. G06N 3/045; B60W 60/0027; B60W 2256/45
See application file for complete search history.

(56) References Cited

U.S. PATENT DOCUMENTS

| 11,810,365 | B1 * | 11/2023 | Crego ..................... G06V 20/58 |
| 2019/0232955 | A1 * | 8/2019 | Grimm ................ G06V 10/803 |
| 2019/0279000 | A1 * | 9/2019 | Pfeifle .................... G08G 1/165 |
| 2021/0325901 | A1 * | 10/2021 | Gyllenhammar ........................... B60W 50/0098 |
| 2022/0092456 | A1 * | 3/2022 | Piot ......................... G06N 3/045 |
| 2022/0135086 | A1 * | 5/2022 | Mahjourian .... B60W 60/00272 701/23 |
| 2022/0171998 | A1 * | 6/2022 | Ni .......................... G06V 40/70 |

FOREIGN PATENT DOCUMENTS

WO   WO 2018232680   12/2018

OTHER PUBLICATIONS

Alahi et al., "Social 1stm: Human trajectory prediction in crowded spaces." Proceedings of the IEEE conference on computer vision and pattern recognition. 2016, 11 pages.

(Continued)

*Primary Examiner* — Andrew J Cromer
(74) *Attorney, Agent, or Firm* — Fish & Richardson P.C.

(57) ABSTRACT

Methods, systems, and apparatus, including computer programs encoded on a computer storage medium, for anomaly estimation for behavior predictions using a neural network. One of the methods includes receiving data characterizing a scene that includes an agent in an environment. A behavior prediction input generated from the data is processed using a behavior prediction model. The behavior prediction model is configured to process the behavior prediction input to generate a predicted probability distribution over a plurality of possible behaviors for the agent. An anomaly estimation input generated from the data is processed using an anomaly estimation model. The anomaly estimation model is configured to process the anomaly estimation input to generate a prediction error for the predicted probability distribution. The prediction error indicates an error between the predicted probability distribution generated by the behavior prediction model and another predicted probability distribution generated by another behavior prediction model.

20 Claims, 4 Drawing Sheets

(56) References Cited

OTHER PUBLICATIONS

Casas et al., "Spagnn: Spatially-aware graph neural networks for relational behavior forecasting from sensor data." 2020 IEEE International Conference on Robotics and Automation (ICRA). IEEE, May 2020, 7 pages.
Hochreiter et al., "Long short-term memory." Neural computation 9.8, Nov. 1997, 32 pages.
Huang et al., "Uncertainty-aware driver trajectory prediction at urban intersections." Submitted on Mar. 2019, arXiv:1901.05105v2, 8 pages.
Ngiam et al., "Scene transformer: A unified architecture for predicting multiple agent trajectories." Submitted on Mar. 2022, arXiv:2106.08417, 25 pages.
Refaat et al., "Agent prioritization for autonomous navigation." Submitted on Sep. 2019, arXiv:1909.08792v1, 8 pages.
Varadarajan et al., "MultiPath++: Efficient Information Fusion and Trajectory Aggregation for Behavior Prediction." submitted on Dec. 2021, arXiv: 2111.14973v3, 22 pages.
Vaswani et al., "Attention is all you need." Advances in neural information processing systems 30, 2017, 11 pages.

* cited by examiner

ANOMALY ESTIMATION NEURAL NETWORKS FOR BEHAVIOR PREDICTION

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions. Some autonomous vehicles can use a variety of on-board sensors and computer systems to predict nearby objects' behavior and trajectory. Predicting a road user's behavior and trajectory correctly and timely is one of the keys to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for estimating anomalies in behavior prediction results generated by an autonomous vehicle. An anomaly estimation model can be trained to generate a prediction that is a prediction of errors in behavior predictions for a nearby object generated by a behavior prediction model on-board an autonomous vehicle. Thus, the autonomous vehicle can make better control and navigation decisions by taking into consideration both the predicted behavior of the nearby object and the corresponding prediction error.

In general, one innovative aspect of the subject matter described in this specification can be embodied in methods that include the actions of receiving data characterizing a scene that includes an agent in an environment; processing a behavior prediction input generated from the data using a behavior prediction model, wherein the behavior prediction model is configured to receive the behavior prediction input and to process the behavior prediction input to generate a predicted probability distribution over a plurality of possible behaviors for the agent; and processing an anomaly estimation input generated from the data characterizing the scene that includes the agent using an anomaly estimation model, wherein the anomaly estimation model is configured to receive the anomaly estimation input and to process the anomaly estimation input to generate a prediction error for the predicted probability distribution, wherein the prediction error indicates an error between the predicted probability distribution generated by the behavior prediction model and another predicted probability distribution generated by another behavior prediction model from the same behavior prediction input. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The behavior prediction model is an on-board behavior prediction model that runs on-board an autonomous vehicle, and wherein the other behavior prediction model is an off-board behavior prediction model that consumes more resources than the on-board behavior prediction model. The off-board behavior prediction model consumes more computational resources than a compute budget allocated for behavior prediction on-board the autonomous vehicle. The behavior prediction model is a neural network model, the other behavior prediction model is another neural network model, and the behavior prediction model has fewer parameters than the other behavior prediction model. The actions further include generating a planned trajectory for an autonomous vehicle based on the predicted probability distribution and the prediction error for the predicted probability distribution, including: if the prediction error is smaller than a threshold value, generating the planned trajectory based on the predicted probability distribution; or if the prediction error is not smaller than the threshold value, modifying the planned trajectory to account for the predicted probability distribution possibly being erroneous. The anomaly estimation input is generated from the data characterizing the scene that includes the agent and the predicted probability distribution.

In general, another innovative aspect of the subject matter described in this specification can be embodied in methods that include the actions of obtaining one or more training inputs, wherein each training input includes a behavior prediction input generated from the data characterizing the scene that includes the agent in the environment; for each training input, processing the training input using the first behavior prediction model, wherein the first behavior prediction model is configured to receive the behavior prediction input and to process the behavior prediction input to generate a first probability distribution over the plurality of possible behaviors for the agent; processing the training input using a second behavior prediction model, wherein the second behavior prediction model is configured to receive the behavior prediction input and to process the behavior prediction input to generate a second probability distribution over the plurality of possible behaviors for the agent; generating a ground truth error between the first probability distribution and the second probability distribution; and processing the anomaly estimation input generated from the data characterizing the scene that includes the agent in the environment using the anomaly estimation model to generate an estimate of an error between the first probability distribution and the second probability distribution; and training the anomaly estimation model based on a loss function that measures a difference between the ground truth error and the estimate of the error between the first probability distribution and the second probability distribution. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The ground truth error between the first probability distribution and the second probability distribution is computed using Kullback-Leibler divergence. The first behavior prediction model is a neural network model, the second behavior prediction model is another neural network model, and the first behavior prediction model has fewer parameters than the second behavior prediction model. The first behavior prediction model is an on-board behavior prediction model that runs on-board an autonomous vehicle, and wherein the second behavior prediction model is an off-board behavior prediction model that consumes more resources than the on-board behavior prediction model. The off-board behavior prediction model consumes more computational resources than a compute budget allocated for behavior prediction on-board the autonomous vehicle. The anomaly estimation input is generated from the data characterizing the scene that includes the agent and the predicted probability distribution.

Particular embodiments of the subject matter described in this specification can be implemented so as to realize one or more of the following advantages.

Conventionally, autonomous vehicles have computer systems that implement an on-board behavior prediction (BP) model to predict nearby agents' behavior or trajectory. The agents can be other road users, e.g., vehicles, cyclists, pedestrians, and so on. However, the BP model can perform poorly in some situations. The computer systems can compare what actually happened in the future to the predicted behavior or trajectory, and can therefore determine errors in the predictions generated by the BP model. The computer systems can use these errors to train an anomaly estimation model that generates a prediction error to predict when the predictions from the BP model are not reliable. However, because the BP model generates outputs that define probability distributions over possible future behaviors, computing an error based on actual future outcomes may undesirably penalize the BP model for making an accurate prediction. For example, in some cases, the predictions generated by the BP model may be correct, i.e., may accurately reflect the underlying probabilities, but the agent may have simply executed a rare maneuver. For example, the BP model can correctly predict that the probability of a nearby car driving straight is 0.999 and the probability of the car turning left is 0.001 in an environment where turning left is not allowed. In such a case, if the car ends up making an illegal left turn, the computer systems can determine a large error between what actually happened in the future and the predicted behavior even though the BP model made a correct behavior prediction for the car.

This specification describes an anomaly estimation model that can be trained to process an anomaly estimation input to generate a prediction error for a predicted probability distribution over a plurality of possible behaviors for an agent. Instead of relying on actual behaviors of agents, the prediction error indicates a predicted error between the predicted probability distribution generated by an on-board behavior prediction model and another predicted probability distribution generated by an off-board behavior prediction neural network model. Because the off-board behavior prediction neural network model is not constrained by a compute budget, e.g., inference time requirements, the off-board behavior prediction neural network model can include more complex neural network architectures with more parameters and can be trained to make more reliable behavior predictions. By comparing the predicted probability distribution generated by the on-board BP model with a more reliable distribution generated by the off-board BP model, the anomaly estimation model can be trained to accurately predict an anomaly, e.g., the inaccurate distributions generated by the on-board BP model. In some implementations, to save computation cost and reduce inference time, the anomaly estimation model can be a part of the on-board BP model, e.g., in the form of an extra head. The anomaly prediction head can reuse an embedding of the data characterizing a scene that includes the agent generated by the on-board BP model without the need to process the data from scratch.

Once trained, the anomaly estimation model can be used on-board an autonomous vehicle to predict situations where the on-board BP model is not performing well. When the anomaly estimation model predicts the on-board BP model is performing poorly, the computer systems on-board the autonomous vehicle, e.g., a planning subsystem of the autonomous vehicle, can generate a planned trajectory of the autonomous vehicle that reflects a reduced confidence in the predictions of the on-board BP model, e.g., a planned trajectory that has an extra buffer away from other road users. For example, extra safety measures can be taken such as slowing down, giving more room, or changing lanes. Thus, the system can leverage the reliability of the off-board BP model to improve the performance of the on-board BP model without deploying the computationally intense off-board model on-board the autonomous vehicle. In some implementations, when the anomaly estimation model predicts the on-board BP model is performing poorly, the computer systems on-board the autonomous vehicle can determine to use an alternative BP model or an alternative BP algorithm which may improve the performance of the behavior predictions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use an anomaly estimation model to generate a prediction error for predicted probability distribution of possible behaviors for an agent in an environment.

Figure 1:
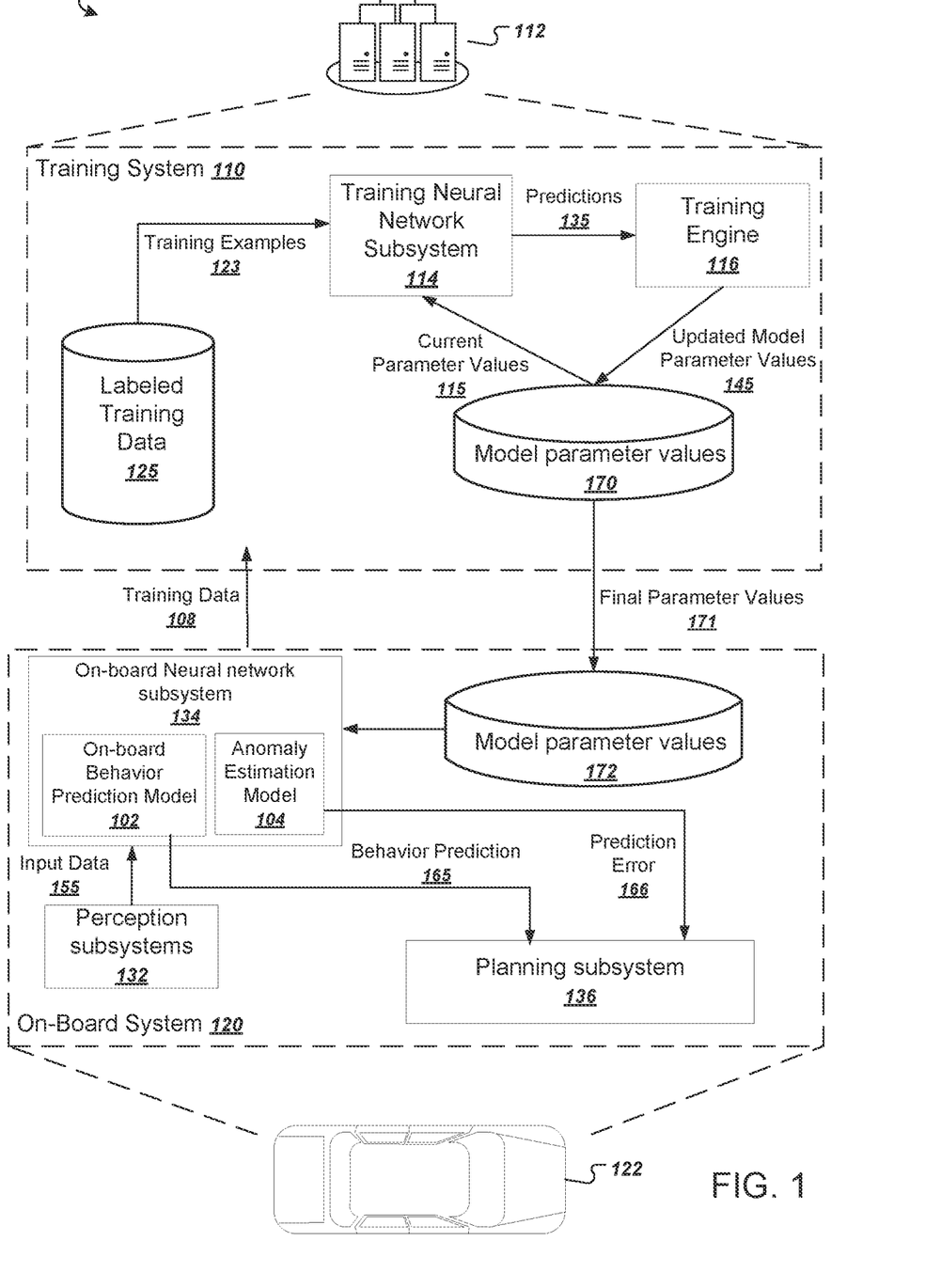
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. In some cases, the vehicle 122 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 122 can autonomously apply the brakes if a prediction indicates that a human driver is about to collide with another vehicle. As another example, the vehicle 122 can have an advanced driver assistance system (ADAS) that assists a human driver of the vehicle 122 in driving the vehicle 122 by detecting potentially unsafe situations and alerting the human driver or otherwise responding to the unsafe situation. As a particular example, the vehicle 122 can alert the driver of the vehicle 122 or take an autonomous driving action when an obstacle is detected, when the vehicle departs from a driving lane, or when an object is detected in a blind spot of the human driver.

The on-board system 120 includes one or more perception subsystems 132. The perception subsystems 132 can generate input data 155 characterizing a scene that includes one or more agents in an environment. The agents can be other road users, e.g., vehicles, cyclists, pedestrians, and so on. The data characterizing a scene that includes an agent can include information of the agent, e.g., object type, object attribute (e.g., child, special vehicle, and turn signal), object property (e.g., human activity, sign), object trajectory, object coordinates, object speed, object heading, and object curvature, etc., information of one or more surrounding agents, information of the environment, e.g., traffic lights, stop signs, etc. For example, the perception subsystem can include a combination of sensor components that receive reflections of electromagnetic radiation, e.g., lidar systems that detect reflections of laser light, radar systems that detect reflections of radio waves, and camera systems that detect reflections of visible light. Additionally, the perception subsystems 132 can obtain predetermined environment information, e.g., information identifying lanes, traffic signs, crosswalks, and other roadway features that can be found in a road graph or map of the environment.

Using the predetermined environment information and sensor captured information, the perception subsystems 132 can generate the input data 155 characterizing a scene that includes an agent in the environment that can help to predict possible behaviors for the agent. For example, the data characterizing a scene that includes an agent in the environment can include an image or a video of the agent over a period of time captured by a camera sensor, point cloud data of the agent captured by a lidar sensor, road information (e.g., lanes and stop signs), locations of surrounding objects (e.g., other vehicles and pedestrians), etc.

The perception subsystems 132 provide input data 155 to an on-board neural network subsystem 134. The on-board neural network subsystem 134 implements operations of an on-board behavior prediction (BP) model 102 and an anomaly estimation model 104. The on-board behavior prediction (BP) model 102 and the anomaly estimation model 104 can be neural network models, such as convolutional neural networks, Long short-term memory (LSTM) neural networks (Hochreiter, Sepp, and Jürgen Schmidhuber. "Long short-term memory." Neural computation 9.8 (1997): 1735-1780), transformer neural networks (Vaswani, Ashish, et al. "Attention is all you need." Advances in neural information processing systems 30 (2017)), etc. Examples of BP model 102 include: MultiPath++ model (Varadarajan, Balakrishnan, et al. "MultiPath++: Efficient Information Fusion and Trajectory Aggregation for Behavior Prediction." arXiv preprint arXiv: 2111.14973 (2021)), Social LSTM (Alahi, Alexandre, et al. "Social lstm: Human trajectory prediction in crowded spaces." Proceedings of the IEEE conference on computer vision and pattern recognition. 2016), and a model that uses agent prioritization (Refaat, Khaled S., et al. "Agent prioritization for autonomous navigation." 2019 IEEE/RSJ International Conference on Intelligent Robots and Systems (IROS). IEEE, 2019).

The on-board neural network subsystem 134 can implement the operations of each layer of the on-board BP neural network model 102 trained to make behavior predictions for nearby agents or agents in the vicinity of the vehicle 122. A nearby agent or an agent in a "vicinity" of the vehicle 122 in an environment is an agent that is within a range of at least one of the sensors of the vehicle 122, e.g., an agent that can be sensed or measured by one or more of the sensors of the vehicle 122. The on-board BP neural network model 102 can receive the input data 155 characterizing a scene that includes an agent in an environment, and can process the input data 155 to generate a predicted probability distribution over a plurality of possible behaviors for the agent. The plurality of possible behaviors for the agent can include possible trajectories of the agent over a future period of time. In some implementations, the plurality of possible behaviors for the agent can include a sequence of heat-maps over a future time period, and the sequence of heat-maps indicate predicted locations of the agent over the future time period.

For example, the on-board BP model 102 can predict a probability distribution for another vehicle in the vicinity of the vehicle 122, including: a driving forward trajectory with a probability 0.3, a lane change trajectory with a probability 0.4, and a stopping trajectory with a probability 0.3. The sum of the trajectory probabilities is 1.0. The predicted trajectory can describe the locations and speeds of the agent at a plurality of possible future time points.

In autonomous driving, predicting the future behavior of agents in the environment is important to enable the on-board system 120 to account for potential safety hazards, and plan a safe and efficient trajectory for the autonomous or semi-autonomous vehicle 122. However, the on-board BP model 102 usually has limited computational resources and strict time constraints (e.g., 10-20 milliseconds) in making timely predictions. The on-board BP model can have a limited number of neural network layers and neural network parameters and/or a limited number of models that can be ensembled. Thus, in some situations, the on-board BP model may make inaccurate behavior predictions.

Conventionally, in order to predict when the on-board BP model 102 makes inaccurate behavior predictions, an anomaly estimation model can be trained to estimate a prediction error between the predicted probability distribution generated by the BP model 102 and an actual behavior of the agents in the future. For example, the actual behavior of an agent can be saved in driving logs of the vehicle. Therefore, the anomaly estimation model can be trained to generate a prediction error indicating a predicted error between the predicted probability distribution and what actually happened in the future. However, computing an error based on actual future outcomes may undesirably penalize the BP model for making an accurate prediction. For example, in some cases, using the actual behavior of the agents as the ground truth probability distribution can result in an inaccurate anomaly estimation model when the agents make a rare behavior or an illegal behavior. Although the BP model accurately reflects the underlying probability, the error computed based on the actual rare behavior (e.g., an illegal left turn) may undesirably penalize the BP model.

The on-board neural network subsystem 134 can implement the operations of each layer of an anomaly estimation neural network model 104 trained to estimate prediction errors 166 for the behavior predictions 165 generated by the on-board behavior prediction model 102. The anomaly estimation neural network model 104 can receive an anomaly estimation input generated from the input data 155 characterizing the scene that includes the agent, and can process the anomaly estimation input to generate a prediction error 166 for the predicted probability distribution 165. In some implementations, the anomaly estimation input can include the data characterizing the scene that includes the agent in the environment, e.g., the same data provided to the on-board behavior prediction model 102. In some implementations, the anomaly estimation input can include an embedding generated from the data characterizing the scene that includes the agent in the environment. In some implementations, the anomaly estimation input can be generated from the predicted probability distribution and the input data 155 characterizing the scene that includes the agent.

For example, the anomaly estimation neural network model 104 can include a convolutional neural network that is similar to a neural network using agent prioritization (Refaat, Khaled S., et al. "Agent prioritization for autonomous navigation." 2019 IEEE/RSJ International Conference on Intelligent Robots and Systems (IROS). IEEE, 2019). As another example, the anomaly estimation neural network model 104 can include a backbone subnetwork (e.g., an encoder subnetwork) similar to MultiPath++ model (Varadarajan, Balakrishnan, et al. "MultiPath++: Efficient Information Fusion and Trajectory Aggregation for Behavior Prediction." arXiv preprint arXiv: 2111.14973 (2021)). In some examples, the anomaly estimation neural network model 104 can include an architecture of a transformer neural network (Vaswani, Ashish, et al. "Attention is all you need." Advances in neural information processing systems 30 (2017)).

Instead of relying on the actual behavior of agents in the future, the prediction error 166 indicates a predicted error between the predicted probability distribution generated by the on-board behavior prediction model 102 and another predicted probability distribution generated by an off-board behavior prediction neural network model. That is, the model 104 predicts an error 166 between (i) the predicted probability distribution generated by the on-board behavior prediction model 102 by processing data characterizing a given scene in an environment and (ii) the predicted probability distribution that would be generated by an off-board behavior prediction model by processing data characterizing the same scene. Because the off-board behavior prediction neural network model is not constrained by a compute budget, e.g., inference time requirements, the off-board behavior prediction neural network model can include more complex neural network architectures with more parameters, can receive and process more complex inputs, and, more generally, can be trained to make more reliable behavior predictions. By comparing the predicted probability distributions of the on-board BP model with a more reliable distribution, the anomaly estimation model 104 can be trained to predict an anomaly, e.g., a prediction error 166 indicating wrong distributions generated by the on-board BP model.

For example, an off-board BP neural network model can include more neural network layers, richer feature processing, more neurons, or a combination of these. For example, the off-board BP neural network model can include larger architectures of a MultiPath++ model (Varadarajan, Balakrishnan, et al. "MultiPath++: Efficient Information Fusion and Trajectory Aggregation for Behavior Prediction." arXiv preprint arXiv: 2111.14973 (2021)) or larger architectures of a model that includes agent prioritization (Refaat, Khaled S., et al. "Agent prioritization for autonomous navigation." 2019 IEEE/RSJ International Conference on Intelligent Robots and Systems (IROS). IEEE, 2019) that are typically hard to run on-board an autonomous vehicle due to computational time constraints, and the on-board BP neural network model can include smaller architectures of the MultiPath++ model or the model that includes agent prioritization.

For example, the on-board BP model 102 can predict probability distributions for possible behaviors for another vehicle, including: driving forward with a probability 0.9 and turning left with a probability 0.1, in an environment where it is a forced left turn. If the data characterizing the scene that includes the other vehicle in the environment were processed by an off-board BP model, the off-board BP model would predict a probability distribution for the other vehicle that would accurately reflect the underlying probabilities, e.g., driving forward with a probability 0.01 and turning left with a probability 0.1. The anomaly estimation model can receive the predicted probability distributions and input data 155 as the anomaly estimation input, and can process the anomaly estimation input to generate a large prediction error (e.g., 0.98) for the predicted probability distributions for the possible behaviors. The large prediction error indicates that the on-board BP model 102 has predicted a probability distribution that is very different from a probability distribution that would have been predicted by an off-board BP model from the same behavior prediction input. Because the off-board BP model can generate more reliable and more accurate behavior predictions than the on-board BP model 102, the large prediction error indicates that on-board BP model 102 has predicted an inaccurate distribution for the possible behaviors of the other vehicle.

As another example, the on-board BP model 102 can predict probability distributions for possible behaviors for another vehicle, including: driving forward with a probability 0.99 and turning left with a probability 0.01, in an environment where turning left is not allowed. If the data characterizing the scene that includes the other vehicle in the environment were processed by the off-board BP model, the off-board BP model would predict a probability distribution for the other vehicle that would accurately reflect the underlying probabilities, e.g., driving forward with a probability 0.999 and turning left with a probability 0.001. The anomaly estimation model can receive the predicted probability distributions and input data 155 as the anomaly estimation input, and can process the anomaly estimation input to generate a small prediction error (e.g., 0.001) for the predicted probability distributions for the possible behaviors. The small prediction error indicates that on-board BP model 102 has predicted a correct distribution for the possible behaviors of the other vehicle.

Thus, the on-board neural network subsystem 134 includes one or more computing devices having software or hardware modules that implement the operations of the anomaly estimation neural network model 104 according to an architecture of the neural network. In some implementations, the anomaly detection model 104 can be part of the on-board BP model 102 in the form of an extra head (i.e., an anomaly prediction head). The anomaly prediction head can reuse an embedding of the data characterizing the scene that includes the agent generated by the on-board BP model without the need to process the data from scratch. The embedding can be generated by an encoder subnetwork of the on-board BP model.

An embedding, as used in this specification, is a numeric representation of a group of sensor data that characterizes an environment region. In particular, an embedding is a numeric representation in an embedding space, i.e., an ordered collection of a fixed number of numeric values, where the number of numeric values is equal to the dimensionality of the embedding space. For example, the embedding can be a vector of floating point or other types of numeric values. Generally, the dimensionality of the embedding space is much smaller than the number of numeric values in the group of sensor data represented by a given embedding.

A BP head of the on-board BP model can generate a predicted probability distribution from the embedding. In some implementations, the input to the anomaly prediction head can include the embedding of the data characterizing the scene that includes the agent in the environment and the predicted probability distribution generated from the BP head. For example, the anomaly estimation input can be the predicted probability distribution concatenated or otherwise combined with the embedding generated from the data characterizing the scene that includes the agent. In some implementations, the anomaly estimation input can be the predicted probability distribution concatenated or otherwise combined with an output embedding generated by an intermediate layer of the BP model.

In some implementations, the input to the anomaly prediction head can include the embedding of the data characterizing the scene that includes the agent in the environment, without including the predicted probability distribution generated from the BP head. Thus, the anomaly prediction can run in parallel with the BP head that generates the predicted probability distribution, saving computation time needed on-board the autonomous vehicle. The anomaly prediction head can include a plurality of convolutional layers, fully-connected layers, regression layers, etc.

The on-board neural network subsystem 134 can implement the operations of each layer of the anomaly estimation neural network model 104 by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the anomaly estimation neural network model 104. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 processes the input data 155 to generate behavior predictions 165 of agents and corresponding prediction errors 166. The on-board neural network subsystem 134 can provide the behavior predictions 165 and prediction errors 166 to a planning subsystem 136.

When a planning subsystem 136 receives the behavior predictions 165, the planning subsystem 136 can use the behavior predictions 165 to make fully-autonomous or semi-autonomous driving decisions. For example, the planning subsystem 136 can generate a fully-autonomous plan to slow down based on a predicted trajectory of a nearby vehicle cutting in front of the autonomous vehicle 122. The planning subsystem 136 can generate a fully-autonomous plan to stop based on a predicted trajectory of a pedestrian to cross the road in front of the autonomous vehicle 122. The planning subsystem 136 can generate a fully-autonomous plan to slow down or give room based on a predicted trajectory of a cyclist to change lanes in front of the autonomous vehicle 122.

When a planning subsystem 136 receives a behavior prediction 165 and the corresponding prediction error 166, the planning subsystem 136 can use the behavior prediction 165 of a nearby agent in the vicinity of the vehicle 122 and the corresponding prediction error 166 to make fully-autonomous or semi-autonomous driving decisions. For example, when the estimated prediction error 166 for a behavior prediction 165 is smaller than a threshold value, the planning subsystem 136 can generate a planned trajectory for the vehicle 122 based on the predicted probability distribution of the behavior prediction 165. When the estimated prediction error 166 for the behavior prediction 165 is not smaller than the threshold value, the planning subsystem 136 can modify the planned trajectory to account for the predicted probability distribution possibly being erroneous. For example, the system can generate a planned trajectory for the vehicle 122 that has an extra buffer away from the agent. For example, the planning subsystem 136 can generate a planned trajectory for the vehicle 122 that keeps a large gap from the agent or slows down near the agent.

The on-board neural network subsystem 134 can also use the input data 155 and the corresponding behavior prediction 165 to generate training data 108. The training data 108 can be used to train the anomaly estimation model 104. The on-board system 120 can provide the training data 108 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of an anomaly estimation neural network model 104 that is configured to generate a prediction error from an anomaly estimation input. The anomaly estimation input includes: (i) input data characterizing a scene that includes an agent in the environment, and in some implementations, (ii) a predicted probability distribution over a plurality of possible behaviors for the agent. In some implementations, the anomaly estimation input includes input data characterizing the scene, without including the predicted probability distribution. The training neural network subsystem 114 includes a plurality of computing devices having software or hardware modules that implement the respective operations of each layer of the neural network according to an architecture of the neural network.

The training anomaly estimation neural network generally has the same architecture and parameters as the on-board anomaly estimation neural network 104. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can be labeled training data 125 that is stored in a database. Each training example includes an anomaly estimation input as well as one or more labels that indicate a ground truth error between the probability distribution included in the anomaly estimation input and another probability distribution generated by an off-board behavior prediction (BP) model. The ground truth error can be computed using a distance measure between the two probability distributions. The distance measure will be described in more detail below with reference to FIG. 2.

The off-board BP model can be trained to receive the input data characterizing the scene that includes the agent in the environment, and process the input data to generate a probability distribution over the plurality of possible behaviors for the agent. Unlike on-board BP model 102 that is limited by a compute budget and time constraint, the off-board BP model can consume more resources than the on-board BP model 102. In some implementations, the off-board BP model can consume more computation resources than a compute budget allocated for behavior prediction on-board the vehicle 122. In some implementations, the off-board BP model can include an ensemble with more members than the number of members used in the on-board BP model, e.g., to better capture uncertainty. For example, the on-board BP model can include an ensemble of two neural network models, and the off-board BP model can include an ensemble of ten neural network models. In some implementations, the off-board BP model can be a deeper neural network with more layers than the on-board BP model, e.g., to have better representation power or capacity. For example, the off-board BP model can be a neural network model that has more parameters than the on-board BP neural network model 102. In some implementations, the inputs and outputs of hidden layers of the off-board BP model can be larger than the on-board BP model, e.g., to have better representation power or capacity. In some implementations, the off-board BP model can receive a more complex behavior prediction input than the behavior prediction input for the on-board BP model. For example, the more complex behavior prediction input can include a more accurate representation of the state of the current environment and the state of the agent.

The training neural network subsystem 114 can generate, for each training example 123, error predictions 135. Each error prediction 135 represents an estimate of an error between the probability distribution included in the anomaly estimation input and the probability distribution generated by the off-board behavior prediction model. A training engine 116 analyzes the error predictions 135 and compares the error predictions to the labels (e.g., the ground truth errors) in the training examples 123 using a loss function, e.g., a regression loss function. The loss function will be described in more detail below with reference to FIG. 2. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. For example, the training system 110 can provide a final set of model parameter values 171 to the anomaly estimation model 104 that runs in the on-board system 120 to generate prediction errors 166 for behavior predictions 165. The training system 110 can provide the final set of model parameter values 171 by a wired or wireless connection to the on-board system 120.

Figure 2:
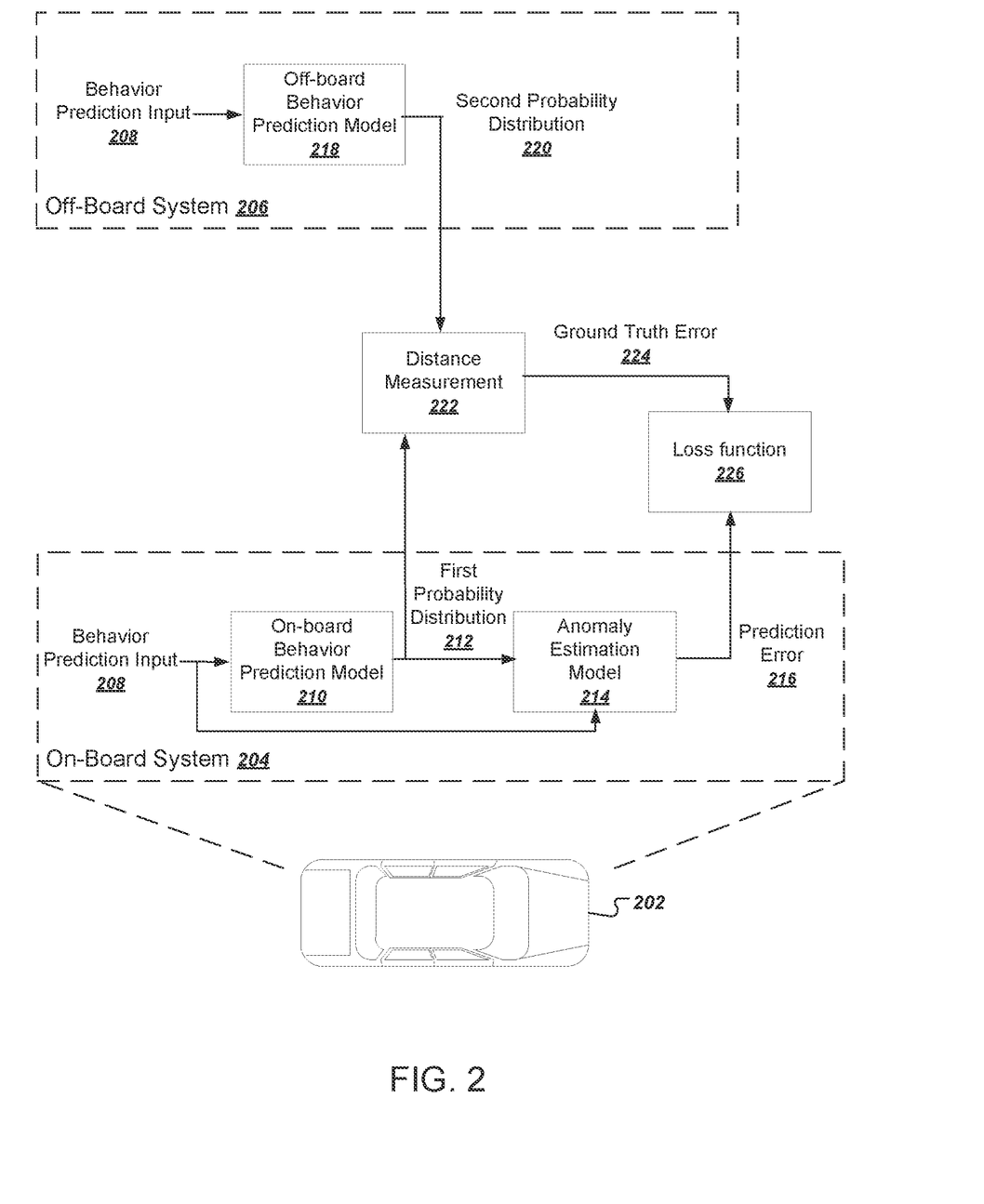
FIG. 2 illustrates an example of training an anomaly estimation model for behavior predictions.

FIG. 2 illustrates an example of training an anomaly estimation model for behavior predictions. An on-board BP model 210 is implemented in an on-board system 204 of a vehicle 202. The on-board BP model 210 can be configured to receive a behavior prediction input 208 characterizing a scene that includes an agent in an environment. The on-board BP model 210 can be configured to process the behavior prediction input 208 to generate a first probability distribution 212 over a plurality of possible behaviors for the agent. For example, the plurality of possible behaviors for a vehicle can include going straight, turning left, turning right, left lane change, right lane change, remaining stationary, or reversing. The sum of the probabilities over the plurality of possible behaviors is 1.0. The on-board BP model 210 can be required to be efficient at resource consumption and can be required to generate the first probability distribution 212 within a limited time such that the planning subsystem of the vehicle 202 can make timely autonomous driving decisions.

An off-board BP model 218 does not need to run in the on-board system 204 of the vehicle 202. The off-board BP model 218 can run on one or more computer systems that is at or away from the vehicle 202, such as an off-board system 206. The off-board BP model 208 can be configured to receive the behavior prediction input 208 characterizing a scene that includes an agent in an environment. The behavior prediction input 208 is the same input to the on-board BP model 210. The off-board BP model 218 can be configured to process the behavior prediction input 208 to generate a second probability distribution 220 over the plurality of possible behaviors for the agent.

Unlike on-board BP model 210 that is limited by a compute budget and time constraint, the off-board BP model 218 can consume more resources than the on-board BP model 210 and thus can be trained to make more accurate behavior predictions. In some implementations, the off-board BP model can consume more computation resources than a compute budget allocated for behavior prediction on-board the vehicle 202. For example, the off-board BP model 218 can be a neural network model that has more parameters than the on-board BP neural network model 102. For example, the off-board BP model 218 can be a transformer neural network model (Ngiam, Jiquan, et al. "Scene Transformer: A unified architecture for predicting multiple agent trajectories." arXiv preprint arXiv: 2106.08417 (2021)) with many neural network layers, a convolutional neural network (e.g., Casas, Sergio, et al. "Spagnn: Spatially-aware graph neural networks for relational behavior forecasting from sensor data." 2020 IEEE International Conference on Robotics and Automation (ICRA). IEEE, 2020, and Refaat, Khaled S., et al. "Agent prioritization for autonomous navigation." 2019 IEEE/RSJ International Conference on Intelligent Robots and Systems (IROS). IEEE, 2019) with many convolutional layers, a MultiPath++ neural network model that uses multi-context gating (Varadarajan, Balakrishnan, et al. "MultiPath++: Efficient Information Fusion and Trajectory Aggregation for Behavior Prediction." arXiv preprint arXiv: 2111.14973 (2021)), etc. In some implementations, the off-board BP model 218 can include an ensemble of two or more neural network models (e.g., 20 models) to provide improved prediction accuracy. In some implementations, the off-board BP model can receive a more complex behavior prediction input than the behavior prediction input for the on-board BP model. For example, the more complex behavior prediction input can include a more accurate representation of the state of the current environment and the state of the agent.

The system computes a ground truth error 224 using the difference between the first probability distribution 212 and the second probability distribution 220. The ground truth error can be computed using a distance measurement 222 that measures distances between two probability distributions. Examples of distance measurements between probability distributions include Kullback-Leibler divergence, total variation distance, Hellinger distance, etc. The distance between the first probability distribution 212 and the second probability distribution 220 is a ground truth error 224 that can be used to train an anomaly estimation model 214.

The anomaly estimation model 214 is configured to receive an anomaly estimation input that can include the behavior prediction input 208 and the first probability distribution 212. In some implementations, the anomaly estimation input can include data generated from the behavior prediction input 208, e.g., an embedding of the behavior prediction input 208, without including the first probability distribution 212. The anomaly estimation model 214 is configured to process the anomaly estimation input to generate a prediction error 216 for the first probability distribution 212. The prediction error 216 is an estimate of an error between the first probability distribution 212 and the second probability distribution 220. The prediction error 216 can indicate when the on-board BP model 210 behaves abnormally, i.e., generates an inaccurate first probability distribution 212 over the plurality of possible behaviors for an agent.

The prediction error 216 can be a single value, e.g., a floating point number or an integer number, that corresponds to the distance measurement 222 used to compute the ground truth error 224. The anomaly estimation model 214 can be a neural network model and the last layer of the neural network model can be a regression layer that outputs a single value for the prediction error 216.

A training system, e.g., the training system 110 of FIG. 1, can train the anomaly estimation model 215 based on a loss function 226 that measures a distance between the ground truth error 224 and the prediction error 216. The loss function 226 can be a regress loss that can be used to train the anomaly estimation neural network model 214. For example, the loss function 226 can measure a mean squared error, a mean squared logarithmic error, or a Pseudo-Huber error. The training system generates updated model parameter values for the anomaly estimation model 214 by using an appropriate updating technique.

Figure 3:
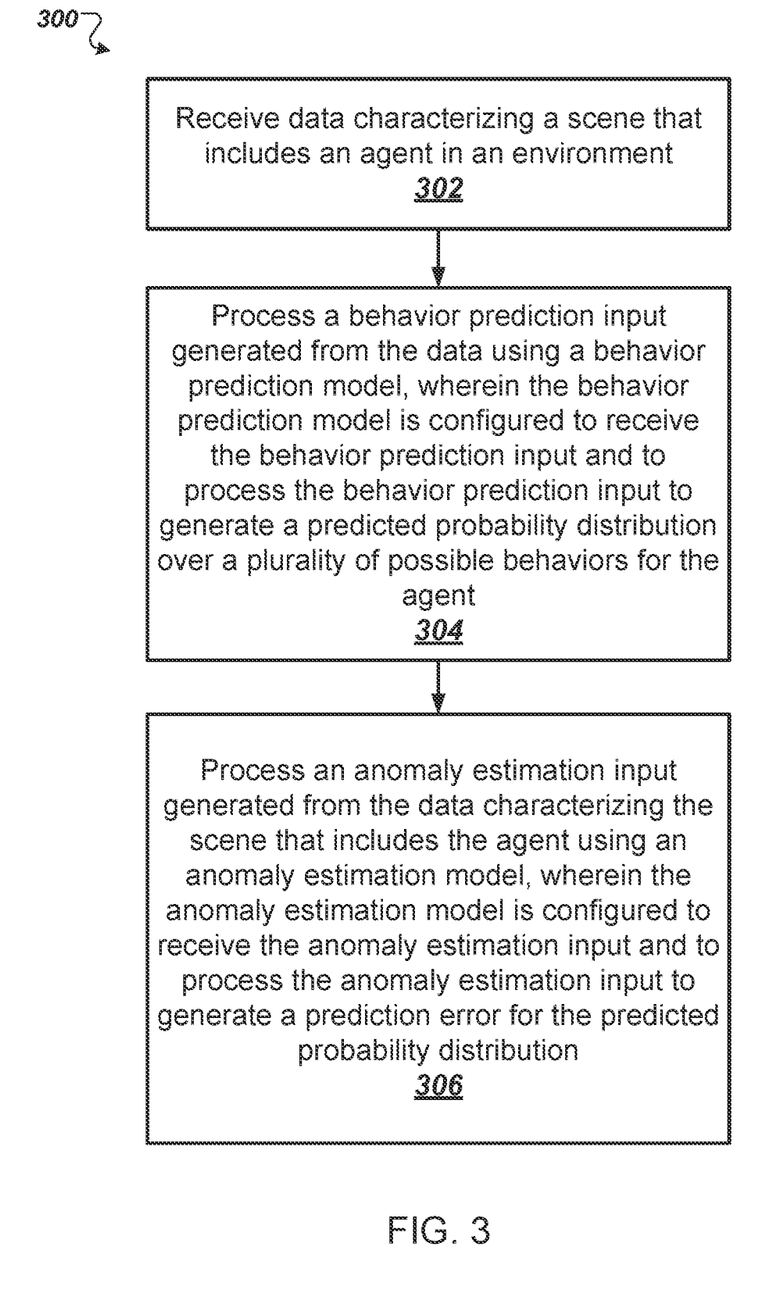
FIG. 3 is a flow chart of an example process for computing a prediction error using an anomaly estimation model.

FIG. 3 is a flow chart of an example process 300 for computing a prediction error using an anomaly estimation model. The example process in FIG. 3 uses a forward inference pass through an anomaly estimation neural network that has already been trained or is being trained to generate a prediction error for predicted probability distribution. The example process can thus be used during training or to make predictions from unlabeled input, e.g., in a production system. The process will be described as being performed by an appropriately programmed neural network system, such as the on-board system 120 or the training system 110 of FIG. 1.

The system receives data characterizing a scene that includes an agent in an environment (302). The data can include sensor data obtained by sensor subsystems, including one or more images of the agent in the environment, and one or more point clouds of the agent. The data can include history trajectory information of the agent in the environment. The data can include information of other surrounding agents, traffic lights, stop signs, maps, etc.

The system processes a behavior prediction input generated from the data using a behavior prediction model (304). The behavior prediction model is configured to receive the behavior prediction input and to process the behavior prediction input to generate a predicted probability distribution over a plurality of possible behaviors for the agent.

The system processes an anomaly estimation input generated from the data characterizing the scene that includes the agent using an anomaly estimation model (306). In some implementations, the anomaly estimation input can include the data characterizing the scene that includes the agent in the environment, e.g., the same data provided to the behavior prediction model. In some implementations, the anomaly estimation input can include an embedding generated from the data characterizing the scene that includes the agent in the environment. The anomaly estimation model is configured to receive the anomaly estimation input and to process the anomaly estimation input to generate a prediction error for the predicted probability distribution. The prediction error indicates an error between the predicted probability distribution generated by the behavior prediction model and another predicted probability distribution generated by another behavior prediction model from the same behavior prediction input. The other behavior prediction model can be trained to generate more accurate behavior predictions than the behavior prediction model.

In some implementations, the anomaly estimation input can be generated from the data characterizing the scene that includes the agent and the predicted probability distribution. For example, the anomaly estimation input can be the predicted probability distribution concatenated or otherwise combined with the embedding generated from the data characterizing the scene that includes the agent. In some implementations, the anomaly estimation input can be the predicted probability distribution concatenated or otherwise combined with an output embedding generated by an intermediate layer of the BP model.

In some implementations, the behavior prediction model can be an on-board behavior prediction model that can run on-board an autonomous vehicle, and the other behavior prediction model can be an off-board behavior prediction model that can consume more resources than the on-board behavior prediction model. Thus, the anomaly estimation model predicts an error between (i) a predicted probability distribution generated by the on-board behavior prediction model by processing the data characterizing a given scene in an environment and (ii) a predicted probability distribution that would be generated by the off-board behavior prediction model by processing data characterizing the same scene.

In some implementations, the off-board behavior prediction model can consume more computational resources than a compute budget allocated for behavior prediction on-board the autonomous vehicle. In some implementations, the behavior prediction model can be a neural network model, and the other behavior prediction model can be another neural network model, and the behavior prediction model can have fewer parameters than the other behavior prediction model. In some implementations, the off-board behavior prediction neural network model can include more complex neural network architectures with more parameters, can receive and process more complex inputs, and more generally, can be trained to make more reliable behavior predictions.

In some implementations, after generating the prediction error for the predicted probability distribution using the anomaly estimation model, the system can generate a planned trajectory for an autonomous vehicle based on the predicted probability distribution and the prediction error for the predicted probability distribution. If the prediction error is smaller than a threshold value, the system can generate the planned trajectory based on the predicted probability distribution. If the prediction error is not smaller than the threshold value, the system can modify the planned trajectory to account for the predicted probability distribution possibly being erroneous. In some implementations, the system can use a different behavior prediction for the agent that is generated by a different model. In some implementations, the system can modify the planned trajectory to be a safer trajectory, e.g., generating an updated planned trajectory that has an extra buffer away from the agent.

For example, if the prediction error is smaller than a threshold value, e.g., 0.5, the system can determine that the predicted probability distribution is likely to be consistent with predicted probability distribution generated by the other behavior prediction model that generates more accurate and reliable predictions. The system can generate the planned trajectory based on the predicted probability distribution. If the behavior prediction model predicts a driving forward trajectory with a probability 0.99 for another vehicle in front of the autonomous vehicle, the planning subsystem of the autonomous vehicle can assign a high confidence score to the behavior prediction and can plan a trajectory of driving forward without slowing down.

As another example, if the prediction error is not smaller than a threshold value, e.g., 0.5, the system can determine that the predicted probability distribution is not likely to be consistent with predicted probability distribution generated by the other behavior prediction model that generates more accurate and reliable predictions. The system can generate the planned trajectory that reflects a reduced confidence in the predictions of the on-board behavior prediction model, e.g., a planned trajectory that has an extra buffer away from the agent. If the behavior prediction model predicts a driving forward trajectory with a probability 0.99 for another vehicle in front of the autonomous vehicle, the planning subsystem of the autonomous vehicle can assign a low confidence score to the behavior prediction because the other vehicle may have a relatively high likelihood of performing other behaviors, such as slowing down or changing lanes. The planning subsystem of the autonomous vehicle can plan a trajectory of driving forward slowly or allowing more space between the autonomous vehicle and the other vehicle.

In some implementations, if the prediction error is not smaller than the threshold value, the system can use a second behavior prediction model that has been trained to make behavior predictions for special situations. If the anomaly estimation model detects an anomaly (i.e., a large prediction error), the system can generate an improved behavior prediction result by switching to the specialized second behavior prediction model. The second behavior prediction model can generate an updated predicted probability distribution over the plurality of possible behaviors for the agent in a special environment. For example, the second behavior prediction model can be configured to handle one or more anomalous behaviors of an agent, to utilize a different output representation that can be reliable in these situations, or a combination of both.

For example, the second behavior prediction model can be configured to generate a single trajectory extrapolating motion or a dense heatmap representing one or more future occupations of the agent. In some implementations, the second behavior prediction model can be trained automatically on training data characterizing a scene that includes an agent in an environment where the main on-board behavior prediction model does not perform well, e.g., when the anomaly estimation model detects a large prediction error.

Figure 4:
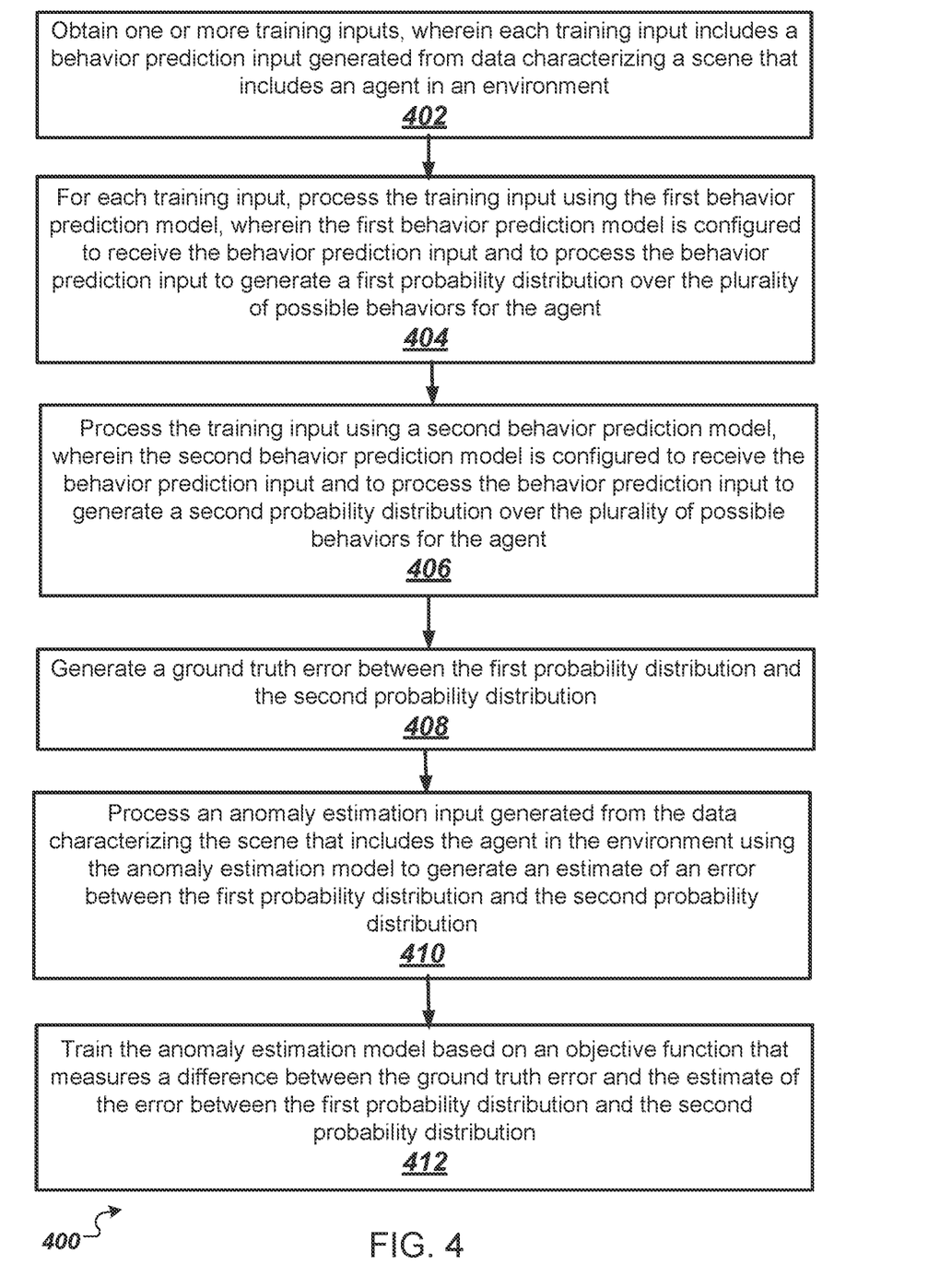
FIG. 4 is a flow chart of an example process for training an anomaly estimation model.

FIG. 4 is a flow chart of an example process 400 for training an anomaly estimation model. The process will be described as being performed by an appropriately programmed neural network system, e.g., the training system 110 of FIG. 1.

The anomaly estimation model is configured to receive an anomaly estimation input and to process the anomaly estimation input to generate a prediction error for a predicted probability distribution over a plurality of possible behaviors for an agent. The predicted probability distribution is generated by a first behavior prediction model from data characterizing the scene that includes the agent in an environment. The anomaly estimation input is generated from the data characterizing the scene that includes the agent.

The system obtains one or more training inputs (402), and each training input includes a behavior prediction input generated from data characterizing a scene that includes an agent in an environment.

For each training input, the system processes the training input using a first behavior prediction model (404). The first behavior prediction model is configured to receive the behavior prediction input and to process the behavior prediction input to generate a first probability distribution over a plurality of possible behaviors for the agent.

The system processes the training input using a second behavior prediction model (406). The second behavior prediction model is configured to receive the behavior prediction input and to process the behavior prediction input to generate a second probability distribution over the plurality of possible behaviors for the agent. In some implementations, the behavior prediction input to the second behavior prediction model can be the same as the input to the first behavior prediction model. In some implementations, the behavior prediction input to the second behavior prediction model can be a more complex input than the input to the first behavior prediction model. For example, the more complex behavior prediction input can include a more accurate representation of the state of the current environment and the state of the agent.

In some implementations, the first behavior prediction model can be a neural network model, and the second behavior prediction model can be another neural network model, and the first behavior prediction model can have fewer parameters than the second behavior prediction model. Thus, the second behavior prediction model can better capture uncertainty and can have better modeling and representation power than the first behavior prediction model. In some implementations, the first behavior prediction model can be an on-board behavior prediction model that can run on-board an autonomous vehicle, and the second behavior prediction model can be an off-board behavior prediction model that can consume more resources than the on-board behavior prediction model. In some implementations, the off-board behavior prediction model can consume more computational resources than a compute budget allocated for behavior prediction on-board the autonomous vehicle.

In some implementations, the first and the second behavior prediction model can be trained using the same training data. In some implementations, the first and the second behavior prediction model can be trained using different training data. For example, because the second behavior prediction model can have better modeling or representation power than the first behavior prediction model, the second behavior prediction model (e.g., the off-board behavior prediction model) can be trained on a larger training dataset that includes more training examples than the training examples that are used to train the first behavior prediction model (e.g., the on-board behavior prediction model).

The system generates a ground truth error between the first probability distribution and the second probability distribution (408). Thus, the system can generate an anomaly training dataset by comparing the predictions generated from the more reliable off-board BP model and the predictions generated from the on-board BP model. In some implementations, the ground truth error between the first probability distribution and the second probability distribution can be computed using Kullback-Leibler (KL) divergence, or any other types of distance measures between probability distributions.

For example, the first behavior prediction model can predict, for another vehicle, driving forward with a probability 0.9, and turning left with a probability 0.1, in a case where it is a forced left turn. The second behavior prediction model can predict 0.01 for driving forward and 0.99 for turning left. Thus, the system can generate a large prediction error (e.g., KL divergence error) by comparing the two probability distributions. Although the second behavior prediction model (e.g., the off-board model) is not perfect because the true distribution is a certain left turn with a 1.0 probability, it can capture the true distribution better than the first behavior prediction model (e.g., the on-board model). Therefore, the system can use the ground truth error to train the anomaly estimation model to predict errors in the predicted probability distribution generated by the first behavior prediction model.

As another example, the first behavior prediction model can predict, for another vehicle, driving forward with a probability 0.999, and turning left with a probability 0.001, in a case where turning left is illegal. The second behavior prediction model may predict driving forward with a probability that is the same as or close to 0.999, and turning left with a probability that is the same as or close to 0.001. Thus, the system can determine that there is either no prediction error or a very small prediction error (e.g., KL divergence error) by comparing the two probability distributions.

The system processes an anomaly estimation input generated from the data characterizing the scene that includes the agent in the environment using the anomaly estimation model to generate an estimate of an error between the first probability distribution and the second probability distribution (410). In some implementations, the anomaly estimation input can include the data characterizing the scene that includes the agent in the environment, e.g., the same data provided to the behavior prediction model. In some implementations, the anomaly estimation input can include an embedding generated from the data characterizing the scene that includes the agent in the environment. In some implementations, the anomaly estimation input can be generated from the data characterizing the scene that includes the agent and the first probability distribution. For example, the anomaly estimation input can be the first predicted probability distribution concatenated or otherwise combined with the embedding generated from the data characterizing the scene that includes the agent. In some implementations, the anomaly estimation input can be the first predicted probability distribution concatenated or otherwise combined with an output embedding generated by an intermediate layer of the BP model.

In some implementations, the anomaly estimation model can be a separate model from the on-board behavior prediction model, and the anomaly estimation input can include the data characterizing the scene that includes the agent in the environment. In some implementations, instead of having a separate model, the anomaly estimation model can be a part of the first behavior prediction model (e.g., the on-board behavior prediction model) in the form of an extra head (e.g., an anomaly prediction head). The extra head can include a plurality of convolutional layers, fully-connected layers, regression layers, etc. The input to the anomaly prediction head can be an embedding generated from the data characterizing the scene that includes the agent in the environment. The embedding can be generated by an encoder included in the on-board behavior prediction model.

The system trains the anomaly estimation model based on a loss function that measures a difference between the ground truth error and the estimate of the error between the first probability distribution and the second probability distribution (412). For example, the loss function can be a regression loss. The system can generate updated model parameter values based on the loss by using an appropriate updating technique, e.g., stochastic gradient descent with backpropagation. The system can then update the collection of model parameter values of the anomaly estimation model using the updated model parameter values.

After the anomaly estimation model is trained, it can be used on-board a vehicle, e.g., the autonomous vehicle 122 of FIG. 1, to detect situations where the on-board behavior prediction model is not making accurate behavior predictions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving data characterizing a scene that includes an agent in an environment;
processing a behavior prediction input generated from the data using a behavior prediction neural network, wherein the behavior prediction neural network is configured to receive the behavior prediction input and to process the behavior prediction input to generate a predicted probability distribution over a plurality of possible behaviors for the agent; and
processing an anomaly estimation input generated from the data characterizing the scene that includes the agent using an anomaly estimation neural network, wherein the anomaly estimation neural network is configured to receive the anomaly estimation input and to process the anomaly estimation input to generate a prediction error for the predicted probability distribution, wherein the prediction error indicates an error between the predicted probability distribution over the plurality of possible behaviors generated by the behavior prediction neural network and another predicted probability distribution over the plurality of possible behaviors that would be generated by another behavior prediction neural network from the same behavior prediction input.

2. The method of claim 1, wherein the behavior prediction neural network is an on-board behavior prediction neural network that runs on-board an autonomous vehicle, and wherein the other behavior prediction neural network is an off-board behavior prediction neural network that consumes more resources than the on-board behavior prediction neural network.

3. The method of claim 2, wherein the off-board behavior prediction neural network consumes more computational resources than a compute budget allocated for behavior prediction on-board the autonomous vehicle.

4. The method of claim 1, wherein the behavior prediction neural network has fewer parameters than the other behavior prediction neural network.

5. The method of claim 1, wherein the prediction error is smaller than a threshold value, further comprising:
generating a planned trajectory for an autonomous vehicle based on the predicted probability distribution.

6. The method of claim 1, wherein the anomaly estimation input is generated from the data characterizing the scene that includes the agent and the predicted probability distribution.

7. The method of claim 1, wherein the prediction error is not smaller than the threshold value, further comprising:
generating a planned trajectory for an autonomous vehicle based on the predicted probability distribution; and
modifying a planned trajectory for an autonomous vehicle to account for the predicted probability distribution possibly being erroneous.

8. A system comprising one or more computers and one or more storage devices storing instructions that when executed by the one or more computers cause the one or more computers to perform operations comprising:
receiving data characterizing a scene that includes an agent in an environment;
processing a behavior prediction input generated from the data using a behavior prediction neural network, wherein the behavior prediction neural network is configured to receive the behavior prediction input and to process the behavior prediction input to generate a predicted probability distribution over a plurality of possible behaviors for the agent; and
processing an anomaly estimation input generated from the data characterizing the scene that includes the agent using an anomaly estimation neural network, wherein the anomaly estimation neural network is configured to receive the anomaly estimation input and to process the anomaly estimation input to generate a prediction error for the predicted probability distribution, wherein the prediction error indicates an error between the predicted probability distribution over the plurality of possible behaviors generated by the behavior prediction neural network and another predicted probability distribution over the plurality of possible behaviors that would be generated by another behavior prediction neural network from the same behavior prediction input.

9. The system of claim 8, wherein the behavior prediction neural network is an on-board behavior prediction neural network that runs on-board an autonomous vehicle, and wherein the other behavior prediction neural network is an off-board behavior prediction neural network that consumes more resources than the on-board behavior prediction neural network.

10. The system of claim 9, wherein the off-board behavior prediction neural network consumes more computational resources than a compute budget allocated for behavior prediction on-board the autonomous vehicle.

11. The system of claim 8, wherein the behavior prediction neural network has fewer parameters than the other behavior prediction neural network.

12. The system of claim 8, wherein the prediction error is smaller than a threshold value, the operations further comprising:
  generating a planned trajectory for an autonomous vehicle based on the predicted probability distribution.

13. The system of claim 8, wherein the prediction error is not smaller than the threshold value, the operations further comprising:
  generating a planned trajectory for an autonomous vehicle based on the predicted probability distribution; and
  modifying a planned trajectory for an autonomous vehicle to account for the predicted probability distribution possibly being erroneous.

14. The system of claim 8, wherein the anomaly estimation input is generated from the data characterizing the scene that includes the agent and the predicted probability distribution.

15. One or more non-transitory computer-readable storage media storing instructions that when executed by one or more computers cause the one or more computers to perform operations comprising:
  receiving data characterizing a scene that includes an agent in an environment;
  processing a behavior prediction input generated from the data using a behavior prediction neural network, wherein the behavior prediction neural network is configured to receive the behavior prediction input and to process the behavior prediction input to generate a predicted probability distribution over a plurality of possible behaviors for the agent; and
  processing an anomaly estimation input generated from the data characterizing the scene that includes the agent using an anomaly estimation neural network, wherein the anomaly estimation neural network is configured to receive the anomaly estimation input and to process the anomaly estimation input to generate a prediction error for the predicted probability distribution, wherein the prediction error indicates an error between the predicted probability distribution over the plurality of possible behaviors generated by the behavior prediction neural network and another predicted probability distribution over the plurality of possible behaviors that would be generated by another behavior prediction neural network from the same behavior prediction input.

16. The non-transitory computer-readable media of claim 15, wherein the behavior prediction neural network is an on-board behavior prediction neural network that runs on-board an autonomous vehicle, and wherein the other behavior prediction neural network is an off-board behavior prediction neural network that consumes more resources than the on-board behavior prediction neural network.

17. The non-transitory computer-readable media of claim 16, wherein the off-board behavior prediction neural network consumes more computational resources than a compute budget allocated for behavior prediction on-board the autonomous vehicle.

18. The non-transitory computer-readable media of claim 15, wherein the behavior prediction neural network has fewer parameters than the other behavior prediction neural network.

19. The non-transitory computer-readable media of claim 15, wherein the prediction error is smaller than a threshold value, the operations further comprising:
  generating a planned trajectory for an autonomous vehicle based on the predicted probability distribution.

20. The non-transitory computer-readable media of claim 15, wherein the prediction error is not smaller than the threshold value, the operations further comprising:
  generating a planned trajectory for an autonomous vehicle based on the predicted probability distribution; and
  modifying a planned trajectory for an autonomous vehicle to account for the predicted probability distribution possibly being erroneous.

* * * * *